Dec. 8, 1953 K. R. DAVIES ET AL 2,661,796
HYDRAULIC CONTROL MEANS FOR ENGINE FUEL SYSTEMS
Filed May 11, 1948
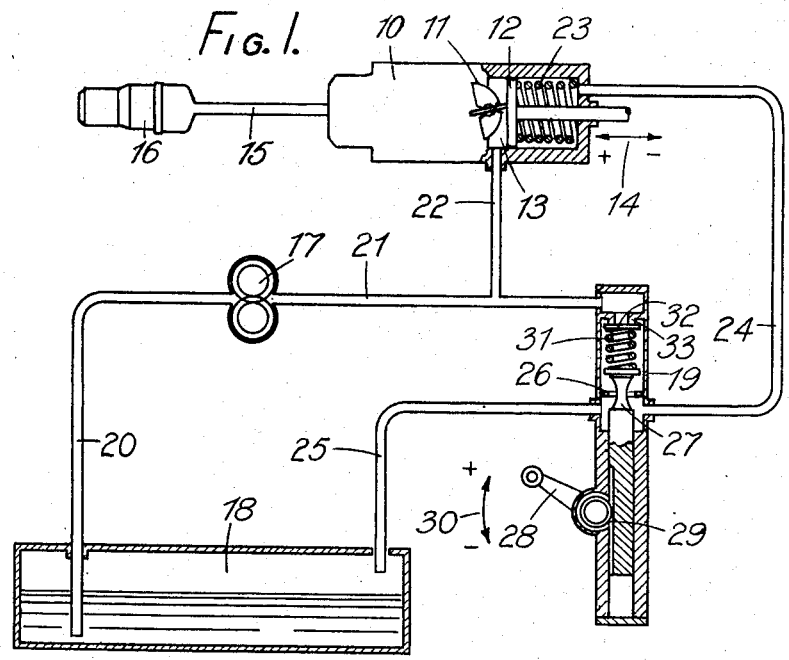
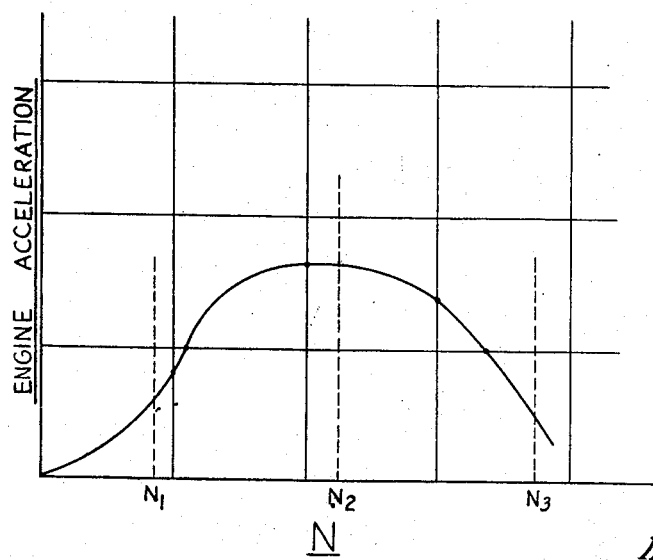
INVENTORS
KENNETH R. DAVIES
& KARL HERBSTRITT
ATTORNEYS

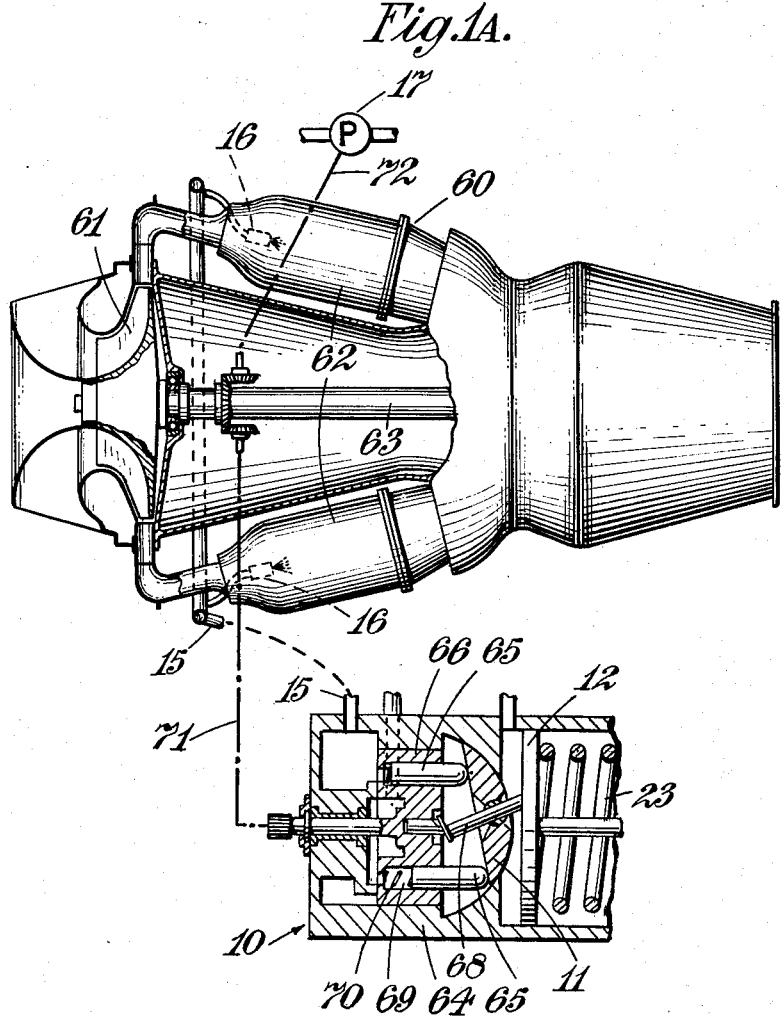

Patented Dec. 8, 1953

2,661,796

UNITED STATES PATENT OFFICE 2,661,796

HYDRAULIC CONTROL MEANS FOR ENGINE FUEL SYSTEMS

Kenneth Roy Davies, Radbourne, near Derby, and Karl Herbstritt, Littleover, Derby, England, assignors to Rolls-Royce Limited, Derby, England, a British company Application May 11, 1948, Serial No. 26,425

Claims priority, application Great Britain May 12, 1947

9 Claims. (Cl. 158—36.4)

This invention relates to gas-turbine engine fuel systems. The invention is concerned with systems hereafter referred to as fuel systems of the kind specified having control means including a hydraulic pump driven at a speed proportional to engine speed and passing liquid through restricting means varied by an engine speed selecting device, and means responsive to the pressure drop across said restricting means and operative to effect variation of fuel delivery to the engine to maintain the selected speed. A particular though not exclusive application of the invention is to gas-turbine-engines used for aircraft jet-propulsion purposes.

In such a fuel system for each setting of the variable restricting means there is a range of engine speed (referred to as the "run-up range") required to vary the fuel delivery between a maximum and a minimum. Such run-up range of speed may be defined as a percentage of the basic speed selected by the setting of the variable restricting means and its value is of considerable importance in maintaining stability of governing.

When the variable restricting means is in the form of a simple orifice the effective area of which is varied by adjusting a speed selecting device, for instance the pilot's power lever, a pressure drop occurs across the orifice which is substantially proportional to the square of the engine speed; the value of the run-up range in a system including such a simple orifice is thus substantially a fixed percentage of the basic selected speed. The run-up range therefore increases with increase of selected speed.

It has been found that the run-up range defined by a simple orifice as mentioned above gives a fuel supply having undesirable characteristics for gas-turbine-engines.

The present invention seeks to provide in a fuel system of the kind specified, means whereby the run-up range can be chosen in correlation to the basic selected engine speed, whereby the fuel supply can be governed to obtain stable running conditions of the engine throughout the normal range of operation, and is also controlled in a desirable manner during change of engine speed.

According to the present invention in a fuel-system of the kind specified for a gas-turbine-engine, the variable restricting means comprises the combination of a resiliently-loaded valve and a variable orifice hydraulically in series so arranged that variation of the effective area of the orifice is accompanied by a simultaneous variation of resilient load on the valve, the combined restriction afforded by the variable orifice and the resiliently-loaded valve in accordance with the setting of the speed selecting device being such that the run-up range suits the characteristics of the engine at the selected speed. It will be appreciated that for any selected combined restriction of the variable restricting means the pressure drop due to the resiliently loaded valve is substantially unaffected by rate of flow through the valve, whilst the pressure drop due to the variable orifice is substantially proportional to the square of the flow and thus to the square of the engine speed, so that by suitably correlating these pressure drops, the run-up range can be selected to suit particular engine characteristics.

Accordingly a feature of this invention comprises so arranging the variable restricting means that the area of the variable orifice is a maximum at that engine speed at which the acceleration of the engine, without overheating of turbine parts, is greatest.

For instance, in the case of one design of gas-turbine engine for aircraft jet propulsion in which the maximum acceleration without overheating of turbine parts occurs at a speed intermediate idling and maximum speeds, the orifice may be varied by a control member which is positioned in relation to the orifice according to the setting of an engine speed selecting lever and whereof the portion co-operating with the orifice is of waisted form so that in moving the control member between positions corresponding to idling and maximum speeds the orifice area is first increased and then decreased.

In this way, the run-up range is greater at the intermediate speed than at the idling or maximum speeds so that more stable governing is achieved. This arrangement also enables the run-up range at maximum speed to be substantially reduced as compared with a simple orifice arrangement so that the tendency for the engine to overspeed on increase of altitude, due to the lower fuel consumption with increase of altitude for a given engine speed, is substantially reduced.

It is further possible to increase the run-up range at low-engine speeds so that a suitable increase in the engine speed is obtained on increase of altitude to avoid for example extinction of combustion on increase of altitude at low engine speeds.

One preferred arrangement in accordance with the invention provides that the resiliently-loaded valve is fully loaded when the variable orifice is most restricted, and opening of the orifice is accompanied by a decrease of the spring loading, i. e. results in reduction of the additional pressure drop attributable to the resiliently loaded valve. In certain cases the maximum effective orifice area may occur for a power lever setting intermediate minimum and maximum power limits of movement.

One fuel system arrangement for a gas-turbine engine will now be described by way of example of this invention, reference being made to the drawings which accompanied the provisional specification and in which:

Figure 1 illustrates the fuel system diagrammatically;

Figure 1A illustrates a typical gas-turbine engine and variable delivery fuel pump for delivering fuel to the engine;

Figure 2 is a graph on which is plotted actual acceleration against engine rotational speed for a typical gas-turbine-engine;

Figure 3:
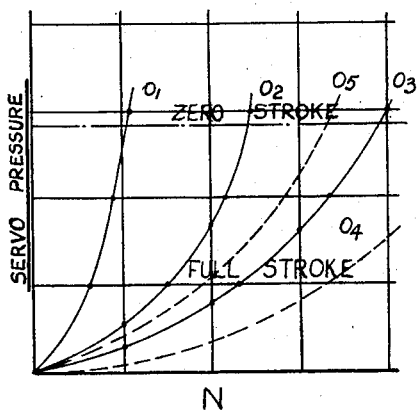
Figure 3 illustrates in graphical form pressure drop across a simple variable orifice plotted against engine rotational speed, in a system where the control in accordance with the invention is not utilised.

Referring to Figure 1A there is illustrated a typical gas-turbine engine and a variable-delivery fuel pump 10 for delivering fuel to the engine. The gas-turbine engine comprises a compressor 61 which delivers compressed air into a series of combustion chambers 62 which are disposed in a ring around the engine and of which two only are shown, a fuel delivery manifold connected with the fuel injection devices 16 for delivering fuel into the combustion chambers 62 wherein the fuel is burnt, and a turbine (not shown) which receives the combustion products from the combustion chamber 62 and drives a shaft 63 carrying the rotor of the compressor 61.

The fuel is delivered to the fuel injection devices 16 by the variable delivery fuel pump 10 through a delivery pipe 15, the pump 10 being driven from the shaft 63 through a drive indicated at 71.

The fuel pump 10 in the form illustrated comprises a body 64, a rotor 66 accommodated within the pump body 64, a plurality of plungers 65 which reciprocate in bores 69 in the rotor 66 against the action of springs 70, and means to adjust the stroke of the pump plunger 65 to vary the delivery of the pump. The means to vary the delivery of the pump is illustrated as comprising a swash plate 11 carried on the cranked portion of a spindle 68 which is axially movable with respect to the pump rotor 66. As the spindle is adjusted axially of the pump rotor, the inclination of the cam face of the swash plates 11 with respect to the rotor axis varies thus altering the stroke of the pump plungers. In operation on rotation of the pump rotor 66 through the drive 71 fuel is drawn into the pump bores through a suction pipe by the pump plungers 65 riding up the cam face of the swash plate 11 under the action of springs 70 and is then discharged into the fuel delivery pipe 15 by the plungers riding down the cam face of the swash plate against the action of the springs 70.

The cranked spindle 68 is arranged to be moved axially of the pump rotor 66 by means of a piston 12 (Figures 1 and 1A) working in a cylinder 13 against the action of spring 23. Movement of the piston 12 to the left results in an increase of the pump stroke and movement of the piston 12 to the right results in a decrease of the pump stroke as indicated by the arrow 14 (Figure 1).

Referring now to Figure 1, there is illustrated control means by which the delivery of the pump 10 is varied, the control means being so arranged that desirable characteristics are obtained in the fuel delivery during steady running of the engine and also during acceleration.

The control means comprises a constant displacement pump, shown diagrammatically as a gear pump at 17, driven at a speed proportional to engine speed through a drive indicated at 72 (Figure 1A) and circulating a liquid in a circuit including a reservoir 18 and variable restriction means generally indicated at 19. The pump 17 draws in liquid on its suction side through pipe line 20 and delivers it through pipe line 21, from which, upstream of the variable restriction means 19, a branch pipe-line 22 communicates with the cylinder 13. Thus pressure upstream of the variable restriction means 19 operates on the piston 12 to move the latter against a resilient load imposed by spring 23. It will be appreciated that where the rate of the spring 23 is substantially constant movement of the piston 12 will be directly proportional to the pressure existing upstream of the orifice means 19. The spring-loaded side of the piston 12 is acted upon by the pressure on the downstream side of the variable restriction means 19 through pipeline 24, which latter communicates by pipeline 25 to the reservoir 18.

The variable restriction means 19 comprises an orifice 26 the effective area of which is varied by a valve element 27 moved in accordance with the setting of a power lever 28, for example, through a rack and pinion mechanism 29. The valve element 27 provides one abutment for a spring 31 which urges a lift valve 32 against its seat 33. The direction in which the power lever is moved to increase and decrease the engine rotational speed is shown by arrow 30, and it will be observed that the movement of the valve element 27 serves progressively to increase the load afforded by spring 31 on the valve 32 as the lever 28 is moved to reduce the selected speed. The valve 32 provides a substantially fixed pressure drop for any particular setting of the power lever 28, i. e. unlike the orifice 26 it does not produce a pressure drop which is considerably affected by the rate of flow of liquid through it.

Figure 4:
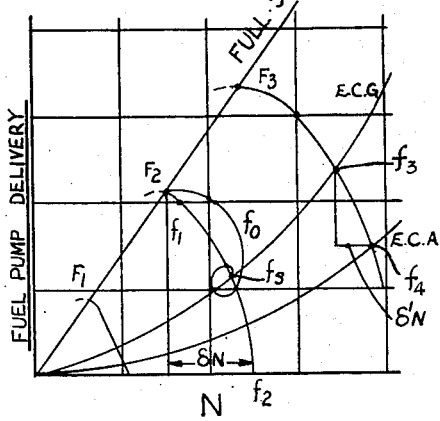
Figure 4 shows in graphical form fuel delivery plotted against the rotational speed, derived from Figure 3.

Turning now to Figures 3 and 4 it is assumed for the purpose of explanation that the spring-loaded valve 33 is omitted; further the waisted valve element 27 is replaced by the normal uniformly tapered needle type valve. The curves $O_1$, $O_2$, $O_3$ in Figure 3 represent the pressure drops arising across the normal valve at three selected orifice openings, plotted against an engine rotational speed (N). This pressure drop is referred to as "servo pressure." If the spring 23 leading the piston 12 has a degree of preload that preload may be represented by the horizontal line designed "full stroke." Likewise the pressure required to move the piston 12 against the spring 23 to zero stroke setting of the fuel pump is designated by the horizontal line "zero stroke." The curves $O_1$, $O_2$, $O_3$ are derived from an approximate square law, since pressure drop is substantially equal to the square of the rate of flow of liquid through the orifice. Therefore, since the pump 17 is driven at a speed proportional to engine speed, the servo pressure is approximately proportional to the square of the engine rotational speed N.

In Figure 4 the curves $O_1$, $O_2$, $O_3$ are transposed to show the delivery of the fuel pump 10 plotted against engine rotational speed N. The line designated "full stroke" represents the pump delivery at constant full stroke, and the pump delivery at "full stroke" is directly proportional to engine rotational speed and the curves $F_1$, $F_2$ and $F_3$ represent the fuel deliveries obtained on reduction of the pump stroke by servo pressures corresponding to the curves $O_1$, $O_2$, $O_3$. A typical engine ground level consumption curve is shown by the line E. C. G. and assuming an orifice setting such as represented by curve $O_2$ has been selected by opening movement of the power lever 28, the engine rotational speed will increase and the fuel pump 10 will deliver fuel in accordance with the full stroke line until the servo pressure attains a value equal to the preload of the spring 23 on the piston 12 when the pump stroke will be decreased, and the fuel delivery of the fuel pump 10 will follow the line $f_1$, $f_2$ with further increase of engine speed to $f_s$ where $f_1$, $f_2$ intersect E. C. G. The point $f_s$ represents the stable running condition of the engine for the selected position of the power lever. Similarly other stable conditions may be obtained according to the selected position of the power lever and the particular engine consumption, which will vary according to various operational conditions.

The above description with reference to Figures 3 and 4 is illustrative of a simple form of hydraulic governor, and it will be observed that the "run-up" hitherto referred to may be represented by the increments of increase of rotational speed, $\delta N$, shown with reference to $f_1$, $f_2$ in Figure 4. As will be observed there is a defined value of N for each setting of the orifice as represented by $O_1$, $O_2$ and $O_3$, and the value of $\delta N$ is substantially a fixed percentage of the basic speeds selected by the orifice settings $O_1$, $O_2$, $O_3$, and thus the magnitude of the run-up range increases with increase of engine speed.

Figure 4 additionally shows curve E. C. A., an altitude engine consumption curve. Assuming orifice $O_3$ has been selected, stable running for ground level will be obtained at $f_3$ (the intersection of E. C. G. and $F_3$) and at altitude at $f_4$ (the intersection of E. C. A. and curve $F_3$), and therefore for any given orifice setting, the engine speed will increase with increases of altitude, the increase in engine speed being represented by $\delta' N$. Since the value of $\delta N$ increases with N, the value of $\delta' N$ will be greatest at the maximum basic speed; this is undesirable owing to the possibility of over-speeding of the engine.

In Figure 2 there is illustrated a typical curve showing engine acceleration plotted against an engine rotational speed (N). The ordinates $N_1$, $N_2$, $N_3$ correspond approximately to engine rotational speeds selected by orifice curves $O_1$, $O_2$, $O_3$ (Figure 3). It will be observed that the engine acceleration is a maximum at $N_2$, and bearing in mind the finite time of response of the governor system in cutting down the fuel delivery, e. g. along curve $f_1$, $f_2$ (Figure 4), it will be clear that when orifice $O_2$ is selected, the rapid acceleration would result in considerable "over-shoot" beyond the selected engine rotational speed i. e. the actual fuel delivery curve might be represented by $f_1$, $f_0$, $f_s$ (Figure 4).

This "overshoot" action is undesirable and, in the embodiment of the invention illustrated in Figure 1, it is avoided by providing the spring-loaded valve 33, the load in which is progressively decreased as the position of the control lever 28 is moved to increase the engine speed, and by suitably shaping the portion of the valve member 27 which cooperates with the orifice 26. The arrangement is also such that the change of engine speed on change of altitude is relatively small.

Figure 5:
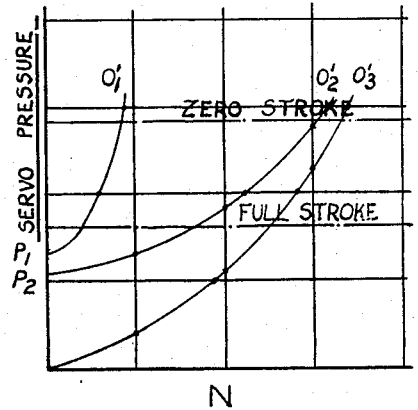
Figure 5 illustrates in graphical form pressure drop across the variable restricting means in accordance with the invention plotted against rotational speed.
Figure 6:
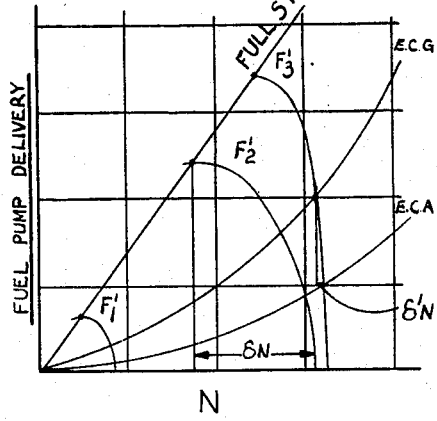
Figure 6 shows in graphical form fuel delivery curves plotted against engine rotational speed derived from Figure 5.

The manner in which the area of orifice 26 and the load on valve 33 is varied will be clear from a consideration of Figures 5 and 6 of the accompanying drawings. Referring to Figure 5, there is shown in graphical form the servo-pressure developed by the variable restriction means with change of engine speed (N). The curve $O'_1$, which is the servo-pressure curve for the idling setting of the control lever 28, i. e. engine speed $N_1$, is of the same shape as curve $O_1$ (Figure 3) but is set-up by an amount $P_1$ corresponding to the load of spring 31. The curve $O'_2$ is that for the setting of control lever 28 corresponding to engine speed $N_2$ at which the maximum rate of engine acceleration occurs, and is that developed by an orifice giving the curve $O_4$ on Figure 3, set-up by an amount $P_2$ corresponding to the reduced spring loading on valve 33. The curve $O'_3$ is that for maximum engine speed $N_3$, and is that produced by the same area orifice as the curve $O_5$ on Figure 3, it being assumed that with this control lever setting, the valve 33 is unloaded.

It will be seen therefore that the portion of the valve member 27 co-operating with the orifice 26 is so shaped that the area of the orifice is a minimum at the idling speed setting of control lever 28, that the area increases to a maximum at the control lever setting corresponding to selected speed $N_2$ (i. e. the speed at which a maximum rate of acceleration is experienced) and that the area then decreases to a value intermediate the maximum and minimum values at a control lever setting for maximum engine speed. It will also be seen that the spring load on valve 33 is progressively reduced as the control lever 28 is moved from its idling speed setting to its maximum speed setting.

The effect of this arrangement on the tendency of the system to "over-shoot" and on the run-up range will be seen from the graphical representation in Figure 6 of the fuel pump delivery against engine speed. In Figure 6, the curve $F'_1$ corresponds to curve $O'_1$ of Figure 5, curve $F'_2$ to curve $O'_2$ and the curve $F'_3$ to the curve $O'_3$.

It will be observed that there is a substantial increase in the value of the run-up range $\delta N$ of the curve $F'_2$ expressed as a percentage of the basic selected speed, as compared with the corresponding value of $\delta N$ of curve $F_2$ (Figure 4). The increase run-up range is desirable in order to maintain stable governing at the basic speed selected by orifice $O'_2$, and will reduce the overshoot effect described in relation to curve $f_1$, $f_0$, $f_s$ in Figure 4. In addition, it will be noticed that the value of $\delta' N$, i. e. the increase of speed arising from an increase of altitude, and defined by the intersection of curve $F'_3$ with E. C. G. and E. C. A. is substantially reduced, as compared with the corresponding value shown in Figure 4. The reduction in the value of δ'N assists in avoiding the possibility of overspeeding of the engine at altitude. In our co-pending British patent application No. 12,820/47, now British Patent 639,260, issued June 28, 1950, we have described means for compensating for the effect of change of altitude by means of a barometric responsive device; the reduction of the value of δ'N can avoid the necessity for providing such barometric means, or can substantially reduce the magnitude of the compensation which it has to effect.

It will be appreciated that by adopting the invention, which is carried into effect in the particular embodiment described by appropriate selection of the spring loading of the spring 31, and the shape of the valve element 27 as shown in Figure 1, it is possible to arrange that the response of the governor system is such as to give a desired response of the engine, and also to take into account any limitations which may be imposed due to the possibility of extinction of combustion.

We claim:

1. Control means for a gas turbine engine fuel system, which control means is of the class comprising a constant displacement hydraulic pump adapted to be driven at a speed proportional to the engine speed, a conduit connected with the delivery of said pump, flow-restricting means in said conduit, and a pressure-responsive device connected with said conduit to respond to the difference in fluid pressures in said conduit on each side of said flow-restricting means and means actuated by the pressure-responsive device in its response to said difference in fluid pressures to adjust the fuel delivery to the engine, characterised by the said flow-restricting means for determining the value of said difference in pressures to which the pressure-responsive device responds, comprising a valve in said conduit, resilient means arranged to load said valve, a variable-area orifice in said conduit hydraulically in series with said valve, an engine speed selecting device arranged for adjustment to vary the effective area of the variable-area orifice and means arranged to vary the loading afforded by said resilient means on said valve in accordance with the adjustment of said engine-speed-selecting device.

2. Control means for a gas-turbine engine fuel-system, which control means is of the class comprising a constant displacement hydraulic pump adapted to be driven at a speed proportional to the engine speed, a conduit connected with the delivery of said pump, flow-restricting means in said conduit, and a pressure-responsive device connected with said conduit to respond to the difference in fluid pressures in said conduit on each side of said flow-restricting means and means actuated by the pressure-responsive device in its response to said difference in fluid pressures to adjust the fuel delivery to the engine, characterized by the said flow-restricting means which determines said difference in fluid pressures, comprising a lift valve and resilient means to load said lift valve arranged in said conduit to afford a substantially fixed pressure drop for each value of the resilient loading on said valve, a variable area orifice in said conduit hydraulically in series with said valve, an engine-speed-selecting device arranged for adjustment to vary the effective area of the variable-area orifice and means arranged to vary the loading afforded by said resilient means on said valve in accordance with the adjustment of said engine-speed-selecting device.

3. Control means for a gas-turbine engine fuel-system, which control means is of the class comprising a constant displacement hydraulic pump adapted to be driven at a speed proportional to the engine rotational speed, a conduit connected with the delivery of said pump, flow-restricting means in said conduit, and a pressure-responsive device connected with said conduit to respond to the difference in fluid pressures in said conduit on each side of said flow-restricting means and means actuated by the pressure-responsive device in its response to said difference in fluid pressures to adjust the fuel delivery to the engine, characterised by the said flow-restricting means comprising a lift valve in said conduit, a spring arranged resiliently to load said valve, an orifice in said conduit hydraulically in series with said lift valve, a valve element arranged to co-operate with said orifice, an engine speed-selecting device arranged to adjust said valve element with respect to the orifice thereby to vary the effective area of the orifice, and an abutment for said spring carried by said valve element to move therewith and thereby to vary the spring loading on the lift valve in accordance with the adjustment of the engine-speed-selecting device.

4. Control means for a gas-turbine engine fuel-system, which control means is of the class comprising a constant displacement hydraulic pump adapted to be driven at a speed proportional to the engine rotational speed, a conduit connected with the delivery of said pump, flow-restricting means in said conduit, and a pressure-responsive device connected with said conduit on each side of said flow-restricting means to respond to the difference in fluid pressures in said conduit on each side of said flow-restricting means and means actuated by the pressure-responsive device in its response to said difference in fluid pressures to adjust the fuel delivery to the engine, characterised by the said flow-restricting means comprising a lift valve in said conduit, a spring arranged resiliently to load said valve, an orifice in said conduit hydraulically in series with said lift valve, a valve element having a portion of waisted form arranged to co-operate with said orifice, an engine-speed-selecting device arranged to adjust said valve element with respect to the orifice so that on displacement of the valve element by the engine-speed-selecting device from one end of its travel to the other the effective area of the orifice is first increased and is then decreased, and an abutment for said spring carried by said valve element to move therewith and thereby to vary the spring loading on the lift valve in accordance with the adjustment of the engine-speed-selecting device.

5. Control means for a gas-turbine engine fuel-system, which control means is of the class comprising a constant displacement hydraulic pump adapted to be driven at a speed proportional to the engine rotational speed, a conduit connected with the delivery of said pump, flow-restricting means in said conduit, and a pressure-responsive device connected with said conduit on each side of said flow-restricting means to respond to the difference in fluid pressures in said conduit on each side of said flow-restricting means and means actuated by the pressure-responsive device in its response to said difference in fluid pressures to adjust the fuel delivery to the engine, characterised by the said flow restricting means comprising a lift valve in said conduit, a spring arranged resiliently to load said lift valve, an orifice in said conduit hydraulically in series with said lift valve, a valve element having a waisted portion co-operating with said orifice to vary its effective area, an engine-speed-selecting device adjustable between positions corresponding to idling and maximum engine rotational speeds and arranged to adjust the said waisted portion of said valve element with respect to said orifice so that when the engine-speed-selecting device is in its position corresponding to idling engine speed the effective area of the orifice is a minimum, that when the engine-speed-selecting device is in a position corresponding to an intermediate engine speed the orifice has a maximum effective area and that when the engine-speed-selecting device is in its position corresponding to maximum engine speed the orifice has an effective area intermediate its minimum and maximum effective areas, and an abutment for said spring carried on the valve element to move therewith, said abutment, said spring and said lift valve being arranged so that as the engine-speed-selecting device is displaced from its position corresponding to idling engine speed to its position corresponding to maximum engine speed the load afforded by the spring on the lift valve is progressively decreased.

6. In a fuel-system for a gas-turbine engine comprising a variable-stroke fuel pump and control means for the fuel pump of the class comprising a constant displacement hydraulic pump adapted to be driven at a speed proportional to the engine rotational speed, a conduit connected with the delivery of said hydraulic pump, flow-restricting means in said conduit, and a pressure-responsive device connected with said conduit on each side of said flow-restricting means to respond to the difference in fluid pressures in said conduit on each side of said flow-restricting means and means actuated by the pressure-responsive device in its response to said difference in fluid pressures to adjust the delivery of the fuel pump, an arrangement of said flow-restricting means which comprises a valve in said conduit, resilient means arranged to load said valve, a variable-area orifice in said conduit hydraulically in series with said valve, an engine-speed-selecting device arranged for adjustment to vary the effective area of the variable-area orifice and means arranged to vary the loading afforded by said resilient means on said valve in accordance with the adjustment of said engine-speed-selecting device.

7. In a fuel-system for a gas-turbine engine comprising a variable-stroke fuel pump and control means for the fuel pump comprising a constant displacement hydraulic pump adapted to be driven at a speed proportional to the engine rotational speed, a conduit connected with the delivery of said hydraulic pump, flow-restricting means in said conduit, and a pressure-responsive device connected with said conduit on each side of said flow-restricting means to respond to the difference in fluid pressures in said conduit on each side of said flow-restricting means and means actuated by the pressure-responsive device in its response to said difference in pressures to adjust the stroke of said variable-stroke fuel pump, an arrangement of said flow-restricting means which comprises a lift valve in said conduit, a spring arranged resiliently to load said lift valve, an orifice in said conduit hydraulically in series with said lift valve, a valve element having a waisted portion to co-operate with said orifice to vary its effective area, an engine-speed-selecting device adjustable between positions corresponding to idling and maximum engine rotational speeds and arranged to adjust the valve element with respect to said orifice so that when the engine-speed-selecting device is in its position corresponding to idling engine speed the effective area of the orifice is a minimum, that when the engine-speed-selecting device is in a position corresponding to an intermediate engine speed the orifice has a maximum effective area and that when the engine-speed-selecting device is in its position corresponding to maximum engine speed the orifice has an effective area intermediate its minimum and maximum effective areas, and an abutment for said spring carried on the valve element to move therewith, said abutment, said spring and said lift valve being arranged so that as the engine-speed-selecting device is displaced from its position corresponding to idling engine speed to its position corresponding to maximum engine speed the load afforded by the spring on the lift valve is progressively decreased.

8. Control means for a gas-turbine engine fuel-system, which control means is of the class comprising a constant displacement hydraulic pump adapted to be driven at a speed proportional to the engine rotational speed, a conduit connected with the delivery of said pump, flow-restricting means in said conduit, and a pressure-responsive device connected with said conduit on each side of said flow-restricting means to respond to the difference in fluid pressures in said conduit on each side of said flow-restricting means and means actuated by the pressure-responsive device in its response to said difference in fluid pressures to adjust the fuel delivery to the engine, characterised by the said flow-restricting means comprising an engine-speed-selecting device, a first flow-restrictor in said conduit arranged to produce a pressure drop which is independent of the flow therethrough but which decreases progressively with the position of adjustment of the engine-speed-selecting device from a position corresponding to idling engine speed to a position corresponding to the maximum engine speed, and a second flow-restrictor hydraulically in series with said first flow-restrictor and arranged to produce a pressure drop which is substantially proportional to the square of the flow therethrough and the effective area of which is varied by adjustment of said engine-speed-selecting device to be a minimum at idling engine speed, to be a maximum at an engine speed intermediate idling engine speed and its maximum speed, and to have a value intermediate the minimum and maximum effective areas at maximum engine speed.

9. In control means for a gas-turbine engine fuel system, a constant displacement hydraulic pump adapted to be driven at a speed proportional to engine rotational speed, a conduit connected with the delivery of said pump, a lift valve in said conduit, a spring resiliently loading said lift valve to close it against the delivery flow from said pump and affording the sole mechanical loading means for said lift valve, an orifice in said conduit in flow series with said valve, a valve element having a waisted portion co-operating with said orifice, an engine speed selecting device connected to move said valve element to adjust the waisted portion with respect to said orifice thereby to vary the effective area of the orifice, an abutment carried by said valve element and co-operating with said spring to vary the resilient load afforded by said spring on said lift valve on adjustment of said engine speed selecting device, a pressure-responsive device and means actuated by said pressure-responsive device to adjust the fuel delivery to the gas-turbine engine, and hydraulic pressure connections from said pressure-responsive device to said conduit, whereof one of said connections is connected to the conduit on the side of the lift valve remote from the adjustable area orifice and the second of said connections is connected to the conduit on the side of the variable area orifice remote from the lift valve.

KENNETH ROY DAVIES.
KARL HERBSTRITT.

References Cited in the file of this patent

UNITED STATES PATENTS

| Number | Name | Date |
| --- | --- | --- |
| 772,294 | Ribourt | Oct. 11, 1904 |
| 1,814,631 | Ray | July 14, 1931 |
| 2,219,994 | Jung | Oct. 29, 1940 |
| 2,291,011 | Vickers | July 28, 1942 |
| 2,369,397 | Kostenick | Feb. 13, 1945 |
| 2,481,334 | Nicolls | Sept. 6, 1949 |
| 2,538,606 | Udale | Jan. 16, 1951 |